United States Patent Office 3,366,625
Patented Jan. 30, 1968

3,366,625
TRIIODO AMINO BENZYL SUBSTITUTED AMINE COMPOUNDS
Jaromír Hebký, Václav Jelínek, and Bohumil First, Prague, and Miroslav Karásek, Modrany, Czechoslovakia, assignors to Spofa, Spojine podniky pro zdravotnickou vyrobu, Prague, Czechoslovakia
No Drawing. Filed Dec. 17, 1965, Ser. No. 514,669
Claims priority, application Czechoslovakia, Dec. 21, 1964, 7,234/64
5 Claims. (Cl. 260—211)

The invention relates to a new type of X-rays contrast agents and to a method of preparing same; said substances have the general Formula I:

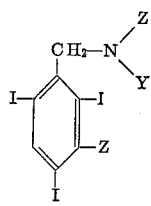

I wherein X and Y are the same or different and are members selected from the group consisting of (a) hydrogen (b) straight or branched alkyl, the said alkyl having up to 7 carbon atoms and including from 0 up to 6 hydroxyl groups (c) benzyl and (d) cyclohexyl, and wherein X and Y may form a saturated ring with the nitrogen atom attached to the methylene of the benzyl group, the said ring containing up to 6 carbon atoms and wherein the ring may contain an oxygen atom or an additional nitrogen atom and wherein Z is a member selected from the group consisting of iodine, amino, acylamino, diacylamino, hydroxy and alkoxy the latter having up to 4 carbon atoms.

The substances of the above cited general Formula I constitute a new type of X-rays contrast agents, suitable for visual tracing the biliary and urinary ducts in X-rays diagnostics. The toxicity of the agents in oral administration is very low.

According to the invention, the substances of the general Formula I are prepared by reacting a benzyl halide of the general Formula II:

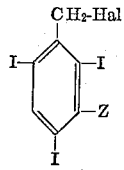

II wherein Hal stands for a halogen atom, in particular chlorine or bromine, I and Z has the same meaning as in Formula I, with an amino compound of the general Formula III:

III wherein X and Y have the same meaning as in the Formula I.

The reaction can be carried out in the presence of a basically reacting, organic or inorganic compound, capable of binding the hydrogen halide formed.

In some instances the reaction takes place already at room temperature, however it is usually carried out at elevated temperature, preferably at the temperature of the boiling point of the mixture.

As the amino compounds of the general Formula III, compounds such as diethyl amine, β-ethanol amine, γ-propanol amine, diethanol amine, trimethylolmethylamine, 2-methyl, 2-amino-1,3-propanediol, piperidine, cyclohexyl amine, benzyl amine, morpholine, piperazine, N-methylpiperazine, N-methylglucamine, 1-amino-1-deoxy-D-arabitol, etc., can be used.

The reaction can be carried out either in the medium of a suitable inert organic solvent, or without it, in the excess of the amino compound of the general Formula III.

The new compounds of the general Formula I are practically colourless, and well crystallizable. They are applied orally, either in the form of the bases, or in the form of salts of acids, which are well tolerated by the organism. Their advantage is rapid resorption in the digestive tract, and rapid filling of the organs to be examined.

Examples (1) A mixture of 26.0 g. (0.05 mole) of 2,4,6-triiodo-3-amino-benzyl chloride, 8.4 g. diethanolamine, 9.3 g. sodium bicarbonate in 100 ml. of absolute ethanol is heated upon stirring for 7 hours at the boiling point under reflux. Thereupon the solid portion is filtered off while hot, and the filtrate is allowed to crystallize. The product eliminated (26.8 g.) is recrystallized from 100 ml. ethanol. The yield is 23.4 g. (79.5%) of N-(2,4,6-triiodo-3-aminobenzyl) diethanolamino, M.P. 111° C.

(2) A mixture of 26.0 g. (0.05 mole) of 2,4,6-triiodo-3-aminobenzyl chloride, 9.7 g. trimethylolmethylamine, 9.5 g. sodium bicarbonate in 150 ml. iso-amyl alcohol is heated for 1.5 hrs. upon stirring at the boiling point under reflux, then filtered while hot, and the filtrate allowed to crystallize. After processing the product, there is obtained 27.2 g. (90.0%) of N-(2,4,6-trriodo-3-aminobenzyl) trimethylolmethylamine, M.P. 182–184° C.

The hydrochloride is prepared e.g. by suspending the base in a fortyfold quantity of ethanol, and alcoholic hydrogen chloride solution is added upon stirring until all of the material is dissolved, and thereupon the alcohol is distilled off in vacuo up to dryness, M.P .205° C. (decomp.).

(3) A mixture of 28.0 g. (0.05 mole) of 2,4,6-triiodo-3-aminobenzyl bromide, 9.7 g. (0.05 mole) piperazine hexahydrate, 8.85 g. (0.05 mole) piperazine dihydrochloride monohydrate in 250 ml. ethanol is heated to the boil for 7 hours under reflux. Then by filtering with suction, while hot, the solid portion is separated and washed with 25 ml. ethanol, whereupon it is boiled off with 3 liters of water acidified with hydrochloric acid to pH 2–3, and the portion remaining undissolved is filtered off with suction. The filtrate is alkalized with ammonia to a pH 10–11, the precipitate is filtered off, washed with water, re-precipitated via hydrochloride, and the base then is crystallized from 50%-aqueous ethanol. The yield is 9.0 g. (31.5%) of N-(2,4,6-triiodo-3-aminobenzyl) piperazine, with M.P. 153–155° C.

(4) A mixture of 30.15 g. (0.5 mole) of 2,4,6-triiodo-3-diacetylaminobenzyl chloride, 5.25 g. diethanolamine and 9.3 g. sodium bicarbonate in 200 ml. ethanol is boiled upon stirring for 7 hours to the boil under reflux. Then while hot, the solid portion is filtered with suction, washed with a little ethanol, and the combined ethanol filtrate is concentrated to a volume of 40 ml., purified with activated charcoal and allowed to crystallize. The portion that settles out (26.5 g.) is recrystallized from ethanol. The yield is 23.5 g. (70%) of N-(2,4,6-triiodo-3-diacetylaminobenzyl) diethanol amine M.P. 160–161° C.

The requisite 2,4,6-triiodo-3-diacetylaminobenzyl chloride is prepared by heating 51.9 g. (0.1 mole) of 2,4,6-triiodo-3-aminobenzyl chloride, 150 ml. acetanhydride and 1 g. concentrated sulfuric acid upon stirring for 2 hrs. to 115–120° C. under reflux. Then the reaction mixture is poured into 1 liter ice water and stirred for 30 min. The product is filtered off with suction, stirred up first in a 250 ml. saturated sodium bicarbonate solution, and then twice with 250 ml. water each, and after drying is crystallized from 240 ml. chloroform. The yield is 47.5 g. (79.0%) M.P. 195–196° C.

(5) A mixture of 22.45 g. (0.04 mole) of 2,4,6-triiodo-3-acetylaminobenzyl chloride, 7.8 g. N-methylglucamine, and 3.7 g. sodium bicarbonate in 100 ml. absolute ethanol is heated upon stirring for 7 hours to the boil under reflux. Thereupon the reaction mixture after adding 600 ml. ethanol is boiled shortly, the undissolved portion is sucked off and washed with 50 ml. ethanol. After cooling down the portion crystallized from ethanol is filtered with suction, and by concentration of the mother liquors a further portion of the product is obtained. The two portions are united (21.8 g.) and recrystallized from 300 ml. ethanol. The yield is 16.9 g. (58.6%) of the N-(2,4,6 - triiodo - 3-acetylaminobenzyl)-N-methylglucamine, M.P. 139–145° C.

(6) A mixture of 28.0 g. (0.05 mole) of 2,4,6-triiodo-3-acetylaminobenzyl chloride, 12.1 g. trimethylolmethyl amine, and 9.3 g. sodium bicarbonate in 150 anhydrous iso-amyl alcohol is heated upon stirring for 1.5 hours to the boil under reflux. Thereupon isoamyl alcohol is distilled off at reduced pressure, and the residue is converted by shaking at room temperature with 100 ml. of 1 N HCl to hydrochloride, which is filtered off with suction, washed with 20 ml. 1 N HCl, and then with water and ethanol. 28.7 g. of the crude hydrochloride is recrystallized from 85 ml. water. The yield is 23.5 g. (68.9%) of the N-(2,4,6-triiodo-3-acetylaminobenzyl)-trimethylolmethyl amine hydrochloride, which upon determination of the melting point is gradually decomposed starting at 129° C.

(7) A mixture of 16.8 g. (0.03 mole) of 2,4,6-triiodo-3-acetylaminobenzyl chloride, 5.4 g. diethanolamine, and 5.7 g. sodium bicarbonate with 60 ml. absol. ethanol is heated upon stirring for 7 hours to the boil under reflux. Then while hot the inorganic salts are filtered off, the filtrate is purified with activated charcoal, and all the alcohol is distilled off in vacuo. The residue is dissolved while hot in 60 ml. absolute ethanol, 16 ml. of ethanolic hydrogen chloride (containing 14.37 g. HCl in 100 ml.) is added, evaporated in vacuo to dryness, and the residue (18.3 g.) is recrystallized from absol. ethanol. The yield is 15.3 g. (76.5%) of the N-(2,4,6-triiodo-3-acetylaminobenzyl)-diethanolamine hydrochloride, with M.P. 204–205° C.

(8) A mixture of 22.5 g. (0.04 mole) of 2,4,6-triiodo-3-acetylaminobenzyl chloride, 6.05 g. (0.04 mole) of 1-amino-1-desoxy-D-arabitol, and 3.7 g. sodium bicarbonate in 130 ml. absol. ethanol is heated upon stirring for 7 hours to the boil under reflux. The solid portion is sucked off, extracted with 200 ml. water, and the undissolved residue (23.4 g. M.P. 221° C.) is recrystallized from ethanol. The yield is 19.2 g. (71%) of N-(2,4,6-triiodo-3 - acetylaminobenzyl)-1-amino-desoxy-D-arabitol, M.P. 221–222° C.

(9) A mixture of 31.5 g. (0.05 mole) of 2,3,4,6-tetraiodobenzyl chloride, 7.3 g. diethylamine, and 4.6 g. sodium bicarbonate in 160 ml. absolute ethanol is heated in a rotary autoclave of 250 ml. capacity to 100° for 7 hours. After cooling down, the oil that separates out becomes crystalline and solidified, and therefore, in order to separate the inorganic salts, is boiled in 100 ml. chloroform, sucked off, and the filtrate concentrated to dryness. The residue was then crystallized from ethanol. The yield is 16.9 g. (50.7%) of N-(2,3,4,6-tetraiodobenzyl)-diethylamine, M.P. 86° C.

(10) A mixture of 25.2 g. (0.04 mole) of 2,3,4,6-tetraiodobenzyl chloride, 7.2 g. diethanolamine, and 7.6 g. sodium bicarbonate with 160 ml. absolute ethanol is heated upon stirring for 6 hrs. to the boil under reflux. Then the inorganic salts are sucked off while hot, and the filtrate left to crystallize. The product is recrystallized from 250 ml. ethanol. The yield is 20.0 g. (71.7%) of pure N-(2,3,4,6-tetraiodobenzyl)-diethanolamine, M.P. 138° C.

(11) A mixture of 18.9 g. (0.03 mole) of 2,3,4,6-tetraiodobenzyl chloride, 11.7 g. N-methylglucamine, and 5.6 g. sodium bicarbonate with 150 ml. absolute ethanol is heated upon stirring for 7 hours to the boil under reflux. The portion eliminated, after cooling down, is sucked off, stirred up in 1 liter water, and filtered again with suction, and crystallized from a large volume of iso-amyl alcohol. The yield is 14.0 g. (59%) of N-methyl-N-(2,3,4,6-tetraiodobenzyl)-glucamine, M.P. 197° C.

(12) A mixture of 31.5 g. (0.05 mole) of 2,3,4,6-tetraiodobenzyl chloride, 8.7 g. morpholine, and 4.6 g. sodium bicarbonate, and 160 ml. absolute ethanol is heated upon stirring for 7 hours to the boil under reflux. The solid portion is sucked off and boiled out with 1600 ml. ethanol. The yield is 25.1 g. (73.8%) of N-(2,3,4,6-tetraiodobenzyl)-morpholine, with M.P. 136° C.

(13) A mixture of 31.5 g. (0.05 mole) of 2,3,4,6-tetraiodobenzyl chloride, 10.5 g. of 2-methyl-2-amino-1,3-propanediol, and 9.3 g. sodium bicarbonate with 200 ml. ethanol is boiled upon stirring for 7 hours under reflux. The solid portion is sucked off while hot, boiled with 75 ml. ethanol, and the portions crystallized from the ethanolic solutions are united (27.2 g.) and recrystallized from 500 ml. ethanol. The yield of the pure N-(2',3',4',6' - tetraiodobenzyl)-1,1-dimethylolethylamine is 20.6 g. (58.8%), M.P. 164–165° C.

(14) A mixture of 31.5 g. (0.05 mole) of 2,3,4,6-tetraiodobenzyl chloride, 8.5 g. piperidine, and 9.3 g. sodium bicarbonate upon 200 ml. absolute ethanol is heated with stirring for 7 hours to the boil under reflux. Thereupon ethanol is distilled off, and the residue is boiled with 120 ml. benzene, the undissolved portion is sucked off and, after addition of 1100 ml. ethanol, purified while hot with activated charcoal, and left to crystallize. After processing of the mother liquors the product is recrystallized from a larger volume of ethanol. The yield is 13.0 g. (38.2%) of pure N-(2,3,4,6-tetraiodobenzyl)-piperidine, with M.P. 80–82° C.

(15) A mixture of 18.9 g. (0.03 mole) of 2,3,4,6-tetraiodobenzyl chloride, 5.4 g. benzylamine, and 5.65 g. sodium bicarbonate in 150 ml. anhydrous n-amyl alcohol is heated upon stirring for 2 hours to the boil under reflux; then the mineral salts are filtered off while hot, and the solution is left to crystallize. The product obtained is recrystallized from 1500 ml. ethanol. The yield is 11.5 g. (55%) of N-(2,3,4,6-tetraiodobenzyl)-benzylamine, M.P. 117–118° C.

(16) A mixture of 31.5 g. (0.05 mole) of 2,3,4,6-tetraiodobenzyl chloride, 10 g. cyclohexylamine, and 9.3 g. sodium bicarbonate upon 200 ml. absolute ethanol is heated with stirring for 7 hours to the boil under reflux. After cooling the solid portion is sucked off, boiled with 200 ml. amyl alcohol, the solution purified with activated charcoal, and left to crystallize. The product is recrystallized from ethyl alcohol. The yield is 28 g. (41%) of N - (2,3,4,6-tetraiodobenzyl) - cyclohexylamine, M.P. 82° C.

(17) A mixture of 31.5 g. (0.05 mole) of 2,3,4,6-tetraiodobenzyl chloride, 6.4 g. γ-propanolamine, and 9.3 g. sodium bicarbonate with 150 ml. iso-amyl alcohol is heated upon stirring for 1.5 hours to the boil under reflux, then it is filtered while hot, and left to crystallize. The yield is 32.0 g. (95.8%) of N-(2,3,4,6-tetraiodobenzyl) γ-propanolamine, M.P. 112° C.

(18) In a way analogous to the preceding example N-(2,3,4,6-tetraiodobenzyl)-β-ethanolamine is prepared. The yield is 76.4%, M.P. 182° C.

(19) Similar to the preceding examples, N-(2,4,6-triiodo-3-aminobenzyl)-β-ethanolamine is prepared, with a yield of 83.3%, M.P. 162–164° C.

(20) Similar to the preceding examples, N-(2,4,6-triiodo-3-aminobenzyl) - γ-propanolamine is prepared, with a yield of 77.4%, M.P. 104° C.

(21) Similar to the preceding examples, N-(2,3,4,6-tetraiodobenzyl) - trimethylolmethylamine, is prepared with a yield of 56%, M.P. 198° C.

We claim:
1. An X-rays contrast agent of the general Formula I:

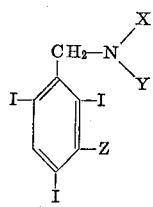

wherein Z and Y are the same or different and are members selected from the group consisting of (a) hydrogen (b) straight or branched alkyl, the said alkyl having up to 7 carbon atoms and including from 0 up to 6 hydroxyl groups (c) benzyl and (d) cyclohexyl, and wherein X and Y may form a saturated ring with the nitrogen atom attached to the methylene of the benzyl group, the said ring containing up to 6 carbon atoms and wherein the ring may contain an oxygen atom or an additional nitrogen atom and wherein Z is a member selected from the group consisting of iodine, amino, acylamino, diacylamino, hydroxy and alkoxy the latter having up to 4 carbon atoms.

2. N - (2,4,6-triiodo-3-aminobenzyl) - diethanolamine, M.P. 111° C.

3. N-(2,4,6-triiodo-3-diacetylaminobenzyl) - diethanolamine, M.P. 160–161° C.

4. N-(2,4,6-triiodo-3-acetylaminobenzyl) - N - methylglucamine, M.P. 139–145° C.

5. N-(2,4,6-triiodo - 3 - acetylaminobenzyl)-diethanolamine hydrochloride, M.P. 204–205° C.

References Cited

UNITED STATES PATENTS

| | | | |
|---|---|---|---|
| 2,552,242 | 5/1951 | Weissberger et al. | 260—562 |
| 3,227,760 | 1/1966 | Richter et al. | 260—570.9 |
| 3,239,528 | 3/1966 | Bebenburg et al. | 260—562 |

OTHER REFERENCES

Keck: "Annalen der Chemie," vol. 662 (1963), pp. 171–177.

LEWIS GOTTS, *Primary Examiner.*

ELBERT L. ROBERTS, *Examiner.*

J. R. BROWN, *Assistant Examiner.*

UNITED STATES PATENT OFFICE
CERTIFICATE OF CORRECTION

Patent No. 3,366,625

January 30, 1968

Jaromír Hebký et al.

It is certified that error appears in the above identified patent and that said Letters Patent are hereby corrected as shown below:

Column 5, line 14, "Z" should read -- X --.

Signed and sealed this 17th day of March 1970.

(SEAL)
Attest:

Edward M. Fletcher, Jr.
Attesting Officer

WILLIAM E. SCHUYLER, JR.
Commissioner of Patents